United States Patent
An et al.

(10) Patent No.: US 10,038,180 B2
(45) Date of Patent: Jul. 31, 2018

(54) RECHARGEABLE LITHIUM BATTERY WITH CONTROLLED PARTICLE SIZE RATIO OF ACTIVATED CARBON TO POSITIVE ACTIVE MATERIAL

(71) Applicant: Samsung SDI Co., Ltd., Yongin-si, Gyeonggi-do (KR)

(72) Inventors: Jung-Woo An, Yongin-si (KR); Sumihito Ishida, Yongin-si (KR); Joon-Kil Son, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 183 days.

(21) Appl. No.: 14/726,177

(22) Filed: May 29, 2015

(65) Prior Publication Data
US 2015/0263336 A1    Sep. 17, 2015

Related U.S. Application Data

(63) Continuation-in-part of application No. 14/092,894, filed on Nov. 27, 2013.

(30) Foreign Application Priority Data

Jul. 2, 2013    (KR) .................. 10-2013-0077375

(51) Int. Cl.
*H01M 4/133*    (2010.01)
*H01M 4/136*    (2010.01)
(Continued)

(52) U.S. Cl.
CPC ........... *H01M 4/133* (2013.01); *H01M 4/136* (2013.01); *H01M 4/587* (2013.01);
(Continued)

(58) Field of Classification Search
None
See application file for complete search history.

(56) References Cited

U.S. PATENT DOCUMENTS

| | | | |
|---|---|---|---|
| 2001/0014422 A1 | 8/2001 | Omaru et al. | |
| 2007/0287068 A1* | 12/2007 | Shimizu | C01B 31/02 429/231.8 |

(Continued)

FOREIGN PATENT DOCUMENTS

| | | |
|---|---|---|
| JP | 2003-077458 A | 3/2003 |
| JP | 2004-103546 | 4/2004 |

(Continued)

OTHER PUBLICATIONS

U.S. Office action dated Oct. 27, 2015, for U.S. Appl. No. 14/092,984, (11 pages).
KIPO Office action dated Oct. 22, 2015, corresponding to Korean Patent application 10-2013-0077375, (4 pages).
English machine translation of Japanese Patent 4461685 B2, dated Feb. 26, 2010, (11 pages).

(Continued)

*Primary Examiner* — Daniel S Gatewood
(74) *Attorney, Agent, or Firm* — Lewis Roca Rothgerber Christie LLP

(57) ABSTRACT

A rechargeable lithium battery that includes: a negative electrode including a negative active material, and a positive electrode including a positive active material and activated carbon. When the positive active material includes a lithium iron phosphate-based compound, the average particle diameter of the activated carbon is greater than or equal to about 1000% and less than or equal to about 3000% of the average particle diameter of the positive active material.

10 Claims, 1 Drawing Sheet

(51) Int. Cl.
*H01M 4/58* (2010.01)
*H01M 4/587* (2010.01)
*H01M 10/0525* (2010.01)
*H01M 4/62* (2006.01)
*H01M 4/02* (2006.01)

(52) U.S. Cl.
CPC ......... *H01M 4/5825* (2013.01); *H01M 4/625* (2013.01); *H01M 10/0525* (2013.01); *H01M 2004/021* (2013.01); *H01M 2220/30* (2013.01)

(56) References Cited

U.S. PATENT DOCUMENTS

| | | | |
|---|---|---|---|
| 2011/0274973 A1* | 11/2011 | Sheem | H01M 4/364 429/220 |
| 2012/0009478 A1 | 1/2012 | Sheem et al. | |
| 2012/0196181 A1 | 8/2012 | Ishida et al. | |
| 2012/0276421 A1 | 11/2012 | Aihara et al. | |
| 2013/0288114 A1 | 10/2013 | An et al. | |

FOREIGN PATENT DOCUMENTS

| | | |
|---|---|---|
| JP | 2004103546 A * | 4/2004 |
| JP | 4461685 B2 | 2/2010 |
| JP | 2013-041697 A | 2/2013 |
| KR | 10-2007-0059718 A | 6/2007 |
| KR | 10-2011-0123096 A | 11/2011 |
| KR | 10-2012-0004801 | 1/2012 |
| KR | 10-2012-0087540 A | 8/2012 |
| KR | 10-2013-0122285 A | 11/2013 |

OTHER PUBLICATIONS

U.S. Office action dated Feb. 24, 2016, for cross reference U.S. Appl. No. 14/092,894, (10 pages).
U.S. Office Action dated Sep. 29, 2016, for cross reference U.S. Appl. No. 14/092,894 (13 pages).
U.S. Advisory Action dated Dec. 23, 2016, for cross reference U.S. Appl. No. 14/092,894 (4 pages).
U.S. Office Action dated Mar. 2, 2017, for cross reference U.S. Appl. No. 14/092,894 (9 pages).
Patent Abstracts of Japan and Machine English Translation of JP 2003-077458 A, 11 Pages.
Patent Abstracts of Japan and Machine English Translation of JP 2013-041697 A, 28 Pages.
Advisory Action mailed by the USPTO for U.S. Appl. No. 14/092,894 dated May 16, 2016 (3 pages).
Office Action mailed by the USPTO for U.S. Appl. No. 14/092,894 dated Jun. 9, 2016 (12 pages).
Hong et al., "Effect of carbon additive on electrochemical performance of $LiCoO_2$ composite cathodes," Journal of Power Sources, May 2002, vol. 111, pp. 90-96.
U.S. Office Action dated Jul. 19, 2017, issued un cross-reference U.S. Appl. No. 14/092,894 (10 pages).
U.S. Office action dated Nov. 24, 2017, for cross reference U.S. Appl. No. 14/092,894, (13 pages).
U.S. Advisory Action dated Feb. 13, 2018, issued in U.S. Appl. No. 14/092,894 (6 pages).
U.S. Office Action dated Mar. 15, 2018, issued in U.S. Appl. No. 14/092,894 (12 pages).

* cited by examiner

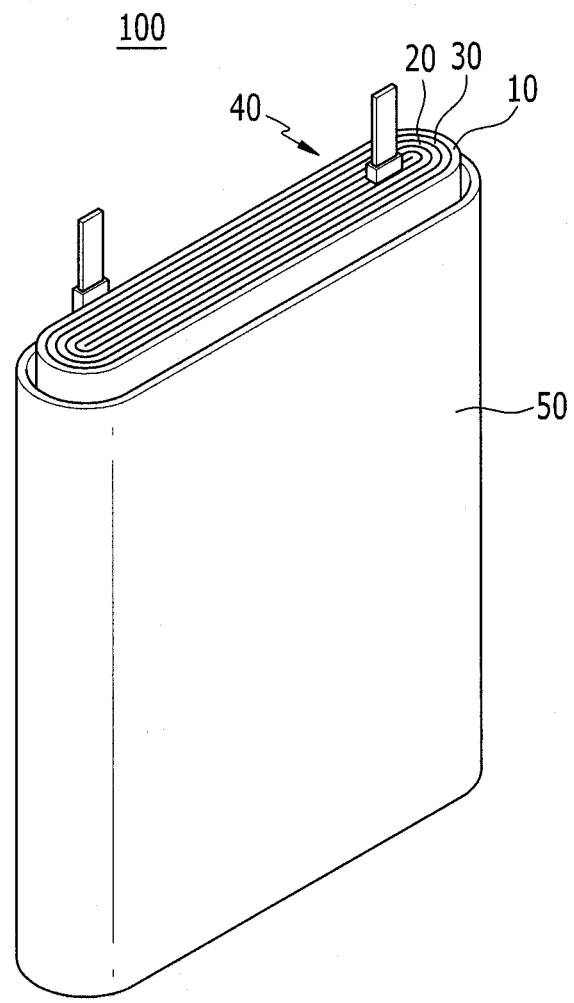

RECHARGEABLE LITHIUM BATTERY WITH CONTROLLED PARTICLE SIZE RATIO OF ACTIVATED CARBON TO POSITIVE ACTIVE MATERIAL

CROSS-REFERENCE TO RELATED APPLICATION

This application is a continuation-in-part application of U.S. patent application Ser. No. 14/092,894 filed on Nov. 27, 2013, which claims priority to and the benefit of Korean Patent Application No. 10-2013-0077375, filed in the Korean Intellectual Property Office on Jul. 2, 2013, the entire contents of which are incorporated herein by reference.

BACKGROUND

1. Field

The following description relates to a rechargeable lithium battery having a controlled particle size ratio of activated carbon to a positive active material.

2. Description of the Related Art

Recently, due to reduction in size and weight of a portable electronic equipment, and popularization of portable electronic devices, researches on rechargeable lithium batteries having high energy density for power source of portable electronic devices have been actively made.

Rechargeable lithium batteries include a negative electrode, a positive electrode, and an electrolyte, and generate electrical energy by oxidation and reduction reactions when lithium ions are intercalated/deintercalated in the positive electrode and negative electrode.

Such rechargeable lithium batteries use a lithium metal, a carbon-based material, Si, or the like for a negative active material.

For a positive active material of rechargeable lithium batteries, metal chalcogenide compounds capable of intercalating and deintercalating lithium ions, for example, composite metal oxides such as $LiCoO_2$, $LiMn_2O_4$, $LiNi_{1-x}Co_xO_2$ (0<X<1), $LiMnO_2$, or the like have been used.

Recently, an attempt has been made to obtain low electrical resistance by making an electrode into a thin film and thus, to accomplish high power characteristics for a rechargeable lithium battery may be realized. However, this approach is not satisfactory yet due to characteristics of the active material itself. Accordingly, a technology of adding activated carbon as a capacitor material to an active material has been developed.

SUMMARY

Aspects of embodiments of the present invention are directed toward rechargeable lithium battery having improved high-rate capability and cycle-life characteristics.

In one embodiment, a rechargeable lithium battery includes: a negative electrode including a negative active material, and a positive electrode including a positive active material and activated carbon. The negative active material includes a carbon-based material having an interlayer spacing of a (002) plane from about 0.34 nm to about 0.50 nm measured by X-ray diffraction using CuKα, the positive active material includes a lithium iron phosphate-based compound, and the average particle diameter of the activated carbon is greater than or equal to about 1000% and less than or equal to about 3000% of the average particle diameter of the positive active material.

The average particle diameter of the activated carbon may be greater than or equal to about 1000% and less than or equal to about 2500% of the average particle diameter of the positive active material.

The positive active material may have an olivine structure.

The positive active material may have an average particle diameter of about 0.1 μm to about 20 μm.

The activated carbon may have an average particle diameter of about 1 μm to about 30 μm.

The activated carbon may be included in an amount of about 1 wt % to about 40 wt % based on the total amount of the positive active material and the activated carbon.

In the negative electrode, the carbon-based material having an interlayer spacing of a (002) plane from about 0.34 nm to about 0.50 nm may be amorphous carbon.

The carbon-based material may be, for example, soft carbon, hard carbon, mesophase pitch carbonized product, fired coke, or a combination thereof.

The carbon-based material may have an average particle diameter of about 1 μm to about 50 μm.

The positive active material may have a structure where a plurality of primary particles are aggregated to form a secondary particle.

Other embodiments of the present invention are described in the detailed description.

The rechargeable lithium battery according to one embodiment has improved high-rate charge and discharge characteristics and cycle-life characteristics.

BRIEF DESCRIPTION OF THE DRAWING

The drawing is a schematic view showing a structure of a rechargeable lithium battery according to one embodiment.

DETAILED DESCRIPTION

Example embodiments will hereinafter be described in more detail. However, these embodiments are examples, and this disclosure is not limited thereto. Further, the use of "may" when describing embodiments of the present invention refers to "one or more embodiments of the present invention."

In one embodiment, a rechargeable lithium battery includes: a negative electrode including a negative active material, and a positive electrode including a positive active material and activated carbon. The rechargeable lithium battery has a controlled particle size ratio (e.g. particle diameter ratio) of activated carbon to a positive active material according to a kind of the positive active material.

In one embodiment, when the positive active material includes a lithium nickel-based oxide, a lithium cobalt-based oxide, a lithium manganese-based oxide, a lithium titanium-based oxide, a lithium nickel manganese-based oxide, a lithium nickel cobalt manganese-based oxide, a lithium nickel cobalt aluminum-based oxide, or a combination thereof, the average particle diameter of the activated carbon is greater than about 100% and less than about 1000% of the average particle diameter of the positive active material.

When the positive active material includes a lithium iron phosphate-based compound, the average particle diameter of the activated carbon is greater than or equal to about 1000% and less than or equal to about 3000% of the average particle diameter of the positive active material.

Such a rechargeable lithium battery has improved high-rate charge and discharge characteristics and cycle-life characteristics.

The rechargeable lithium battery is described referring to the drawing. The drawing is a schematic view showing a rechargeable lithium battery according to one embodiment.

Referring to the drawing, a rechargeable lithium battery 100 according to one embodiment includes an electrode assembly 40 in which a separator 30 is interposed between a positive electrode 10 and a negative electrode 20, and a case 50 housing the electrode assembly 40. The positive electrode 10, the negative electrode 20 and the separator 30 are impregnated in an electrolyte solution.

First, the positive electrode 10 will be described.

The positive electrode 10 includes a current collector and a positive active material layer formed on the current collector, and the positive active material layer includes a positive active material and activated carbon.

When the positive active material includes a lithium nickel-based oxide, a lithium cobalt-based oxide, a lithium manganese-based oxide, a lithium titanium-based oxide, a lithium nickel manganese-based oxide, a lithium nickel cobalt manganese-based oxide, a lithium nickel cobalt aluminum-based oxide, or a combination thereof, the average particle diameter of the activated carbon is (i.e., controlled to be) greater than about 100% and less than about 1000% of the average particle diameter of the positive active material. For example, the average particle diameter of the activated carbon is greater than about 100% and less than or equal to about 900%, greater than about 100% and less than or equal to about 800%, greater than about 100% and less than or equal to about 700%, greater than about 100% and less than or equal to about 600%, greater than about 100% and less than or equal to about 500%, or greater than about 100% and less than or equal to about 400% of the average particle diameter of the positive active material.

In this case, the positive active material and the activated carbon are uniformly dispersed, and the activated carbon is uniformly distributed between the active material particles to form a uniform electrode. In addition, partial deterioration by repetitive charge and discharge and high-rate input and output may be suppressed due to the uniform electrode and thus, cycle-life characteristics may be improved. When the activated carbon having the same or smaller particle diameter than the positive active material is used, the activated carbon may have a larger contact area with the positive active material, but the effect of using activated carbon may be decreased, especially during high-rate charge and discharge, and thus, lead to deteriorated high-rate charge and discharge efficiency and cycle-life characteristics.

In addition, the activated carbon may increase an effect of physically adsorbing lithium ions and rapidly transporting the adsorbed lithium ions to the positive active material in a rechargeable lithium battery.

In particular, the effect of the activated carbon may be further increased during high-rate charge and discharge and lead to much improved high-rate charge and discharge efficiency and cycle-life characteristic of the rechargeable lithium battery.

The positive active material may have a structure where a plurality of primary particles are aggregated to form a secondary particle, and the secondary particle may have a size of about 1 μm to about 20 μm. For example, the secondary particle may have a size of about 1 μm to about 18 μm, about 1 μm to about 16 μm, about 1 μm to about 14 μm, about 1 μm to about 12 μm, or about 1 μm to about 10 μm.

In one embodiment, the positive active material has a particle size of about 1 μm to about 20 μm, and the average particle diameter of the activated carbon is greater than about 100% and less than about 1000% of the average particle diameter of the positive active material.

The activated carbon is a carbon material having a large specific surface area and strong adsorption property and may play a role of physically adsorbing lithium ions and rapidly transporting the lithium ions to the positive active material.

The activated carbon may have an average particle diameter of about 1 μm to about 30 μm. For examples, the activated carbon may have an average particle diameter of about 1 μm to about 28 μm, about 1 μm to about 26 μm, about 1 μm to about 24 μm, about 1 μm to about 22 μm, about 1 μm to about 20 μm, about 1 μm to about 18 μm, about 1 μm to about 16 μm, about 1 μm to about 14 μm, about 1 μm to about 12 μm, about 1 μm to about 10 μm, but is not limited thereto. Herein, the positive active material and the activated carbon are uniformly dispersed and thus, lead to improved high-rate charge and discharge and cycle-life characteristic of a rechargeable lithium battery, since performance of the activated carbon is increased or maximized.

The activated carbon may be included in an amount of about 1 wt % to about 40 wt % based on the total amount of the positive active material and the activated carbon. For example, the activated carbon may be included in an amount of about 1 wt % to about 35 wt %, about 1 wt % to about 30 wt %, about 1 wt % to about 25 wt %, about 1 wt % to about 20 wt %, about 1 wt % to about 15 wt %, or about 1 wt % to about 10 wt %. In this case, high-rate charge and discharge characteristics and cycle-life characteristics of a rechargeable lithium battery may be improved.

As described above, in another embodiment of the present invention, a rechargeable lithium battery includes the positive active material including a lithium iron phosphate-based compound, and the average particle diameter of the activated carbon being greater than or equal to about 1000% and less than or equal to about 3000% of the average particle diameter of the positive active material The ratio of the average particle diameter of the activated carbon to the average particle diameter of the positive active material may be, in one embodiment, from greater than or equal to about 10 (or 1000%) and less than or equal to about 28 (or 2800%), greater than or equal to about 10 (or 1000%) and less than or equal to about 26 (or 2600%), greater than or equal to about 10 (or 1000%) and less than or equal to 25 (or 2500%), greater than or equal to about 10 (or 1000%) and less than or equal to 24 (or 2400%), or greater than or equal to about 10 (or 1000%) and less than or equal to about 23 (or 2300%).

Herein, the positive active material and the activated carbon are uniformly dispersed and thus, high-rate charge and discharge and cycle-life characteristics of a rechargeable lithium battery may be improved, since performance of the activated carbon is increased or maximized.

The positive active material may have an olivine structure. In other words, the positive active material according to one embodiment has an olivine structure, and herein, the average particle diameter of the activated carbon is greater than or equal to about 1000% and less than or equal to about 3000% of the average particle diameter of the positive active material.

The positive active material including the lithium iron phosphate-based compound or olivine-based positive active material may have an average particle diameter of about 0.1 μm to about 20 μm. For example, the average particle diameter may be from about 0.1 μm to about 15 μm, about 0.1 μm to about 10 μm, about 0.1 μm to about 9 μm, about 0.1 μm to about 8 μm, or about 0.1 μm to about 7 μm. The positive active material may have a structure where a plurality of primary particles are aggregated to form a secondary particle, and the secondary particle may have a size of about 0.1 μm to about 20 μm.

In one embodiment, when the positive active material has a particle diameter of about 0.1 μm to about 20 μm, the average particle diameter of the activated carbon is greater than or equal to about 1000% and less than or equal to about 3000% of the average particle diameter of the positive active material. In this case, high-rate charge and discharge characteristics and cycle-life characteristics of a rechargeable lithium battery may be improved.

The activated carbon is the same as described above.

The positive electrode may include Al as a current collector, but is not limited thereto.

The positive active material layer may further include a binder. The binder improves the binding properties of the positive active material particles with one another and with the current collector.

Examples of suitable binder materials may include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The positive active material layer may further include a conductive material. The conductive material improves conductivity of the electrode. Any suitable electrically conductive material may be used as a conductive material, unless it causes a chemical change. Examples thereof include one or more of natural graphite, artificial graphite, carbon black, acetylene black, ketjen black, carbon fiber; a metal powder or a metal fiber of copper, nickel, aluminum, silver, or the like; and a conductive material such as a polyphenylene derivative or the like.

In another embodiment, a method of preparing a positive active material layer includes: determining an average particle size of an active material; and controlling an average particle size of an activated carbon, wherein the average particle size of the activated carbon is controlled to be greater than about 100% and less than about 1000% of the average particle size of the active material when the positive active material layer includes the activated carbon and the active material is selected from a lithium nickel-based oxide, a lithium cobalt-based oxide, a lithium manganese-based oxide, a lithium titanium-based oxide, a lithium nickel manganese-based oxide, a lithium nickel cobalt manganese-based oxide, a lithium nickel cobalt aluminum-based oxide, or a combination thereof; or the average particle size of the activated carbon is controlled to be greater than or equal to about 1000% and less than or equal to about 3000% of the average particle size of the active material when the positive active material layer includes the activated carbon and a lithium iron phosphate-based active material.

Hereinafter, the negative electrode will be described.

The negative electrode 20 includes a current collector and a negative active material layer formed on the current collector, and the negative active material layer includes a negative active material.

The negative active material includes a carbon-based material having an interlayer spacing ($d_{002}$) of a (002) plane from about 0.34 nm to about 0.50 nm measured by X-ray diffraction using CuKα. Such negative active material may easily intercalate and deintercalate lithium ions and realize excellent high-rate charge and discharge characteristics of a lithium rechargeable battery.

The carbon-based material may have an interlayer spacing ($d_{002}$) of about 0.34 nm to about 0.45 nm, about 0.34 nm to about 0.40 nm, about 0.34 nm to about 0.37 nm, or about 0.34 nm to about 0.36 nm. In one embodiment, when the interlayer spacing is within these ranges, the carbon-based material can easily intercalate and deintercalate lithium ions and realize excellent high-rate charge and discharge characteristics of a lithium rechargeable battery.

The carbon-based material may be amorphous carbon. The amorphous carbon effectively has un-limited path for intercalating and deintercalating lithium ions, unlike graphite and crystalline carbon. The amorphous carbon also barely hardly (by a very small margin) expands the electrode and thus, may realize a lithium rechargeable battery having high power characteristics, a long cycle-life, and particularly high reversible capacity in a heat treatment at a temperature of less than or equal to about 800° C.

Examples of the amorphous carbon include soft carbon, hard carbon, a mesophase pitch carbonized product, fired coke, and the like. For example, the carbon-based material may be soft carbon.

The soft carbon is graphitizable carbon that can be easily transformed into a graphite structure when the temperature increases in a heat treatment, since atoms in the soft carbon are arranged so that they can easily form a layered structure. Since the soft carbon has a disordered crystal structure compared with graphite, and thus, provides many gates for helping ions to move in and out of the crystal structure. The soft carbon also has a less degree of disorder than hard carbon, therefore, ions may be easily diffused. For example, the carbon-based material may be a low crystalline soft carbon.

The carbon-based material may have an average particle diameter (D50) of about 1 μm to about 50 μm. For example, the carbon-based material may have an average particle diameter (D50) of about 1 μm to about 40 μm, about 1 μm to about 30 μm, about 1 μm to about 20 μm, about 5 μm to about 50 μm, about 10 μm to about 50 μm, about 5 μm to about 15 μm, or about 6 μm to about 12 μm. Herein, appropriate pores are present in the negative electrode composition and produce (or provide) many activation sites connecting crystallines and thus, passing and storing lithium ions, and accordingly, the negative electrode composition may decrease contact resistance and realize rapid storage and high power characteristics at a low temperature.

The D50 indicates a particle size at 50% of a volume ratio in a cumulative size-distribution curve.

The carbon-based material may have various shapes including spherical shape, sheet shape, flake shape, fiber shape, and the like, for example, needle shape.

The carbon-based material may have a specific surface area of about 0.1 $m^2/g$ to about 20 $m^2/g$, for example, about 0.1 $m^2/g$ to about 10 $m^2/g$, about 1 to about 20 $m^2/g$, about 1 $m^2/g$ to about 10 $m^2/g$, or about 1 $m^2/g$ to about 5 $m^2/g$. In one embodiment, when a carbon-based material having a specific surface area within the range is used as a negative active material, a low crystalline carbon-based material is obtained, accomplishing excellent high-rate capability and high-rate cycle-life characteristics.

The carbon-based material may have a tap (or tapped) density of about 0.30 $g/cm^3$ to about 10.00 $g/cm^3$, for example, about 0.60 $g/cm^3$ to about 10.00 $g/cm^3$, about 0.30 g/cm³ to about 5.00 g/cm³, or about 0.60 g/cm³ to about 5.00 g/cm³. In one embodiment, when a carbon-based material having a tap density within the range is used as a negative active material, a low crystalline carbon-based material is obtained, accomplishing excellent high-rate capability and high-rate cycle-life characteristics.

The negative active material layer may further include a binder.

The binder improves the binding properties of the negative active material particles with one another and with a current collector. Examples thereof include polyvinyl alcohol, carboxylmethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The negative active material layer may further include a conductive material.

The conductive material improves electrical conductivity of an electrode. Any suitable electrically conductive material may be used as a conductive material, unless it causes a chemical change. Examples thereof include a carbon-based material such as natural graphite, artificial graphite, carbon black, acetylene black, ketjen black, carbon fiber or the like; a metal-based material such as a metal powder or a metal fiber or the like of copper, nickel, aluminum, silver, or the like; a conductive polymer such as a polyphenylene derivative or the like; and a mixture thereof.

The current collector may include a copper foil, a nickel foil, a stainless steel foil, a titanium foil, a nickel foam, a copper foam, a polymer substrate coated with a conductive metal, or a combination thereof.

The electrolyte includes a non-aqueous organic solvent and a lithium salt.

The non-aqueous organic solvent serves as a medium for transmitting (or transporting) ions taking part in the electrochemical reaction of a battery.

The non-aqueous organic solvent may include a carbonate-based, ester-based, ether-based, ketone-based, alcohol-based, or aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like; and the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, or the like. The ether-based solvent may include dibutyl ether, tetraglyme, diglyme, dimethoxyethane, 2-methyltetrahydrofuran, tetrahydrofuran, or the like; and the ketone-based solvent may include cyclohexanone, or the like. The alcohol-based solvent may include ethyl alcohol, isopropyl alcohol, or the like; and the aprotic solvent may include nitriles such as R—CN (where R is a C2 to C20 linear, branched, or cyclic hydrocarbon, a double bond, an aromatic ring, or an ether bond), amides such as dimethylformamide, or dioxolanes such as 1,3-dioxolane, sulfolanes, or the like.

The non-aqueous organic solvent may be used singularly or in a mixture. When the organic solvent is used in a mixture, the mixture ratio may be controlled in accordance with a desirable battery performance.

The carbonate-based solvent is prepared by mixing a cyclic carbonate and a linear carbonate. The cyclic carbonate and linear carbonate are mixed together in a volume ratio of about 1:1 to about 1:9. In one embodiment, when the mixture is used as an electrolyte, it has enhanced performance.

In addition, the organic solvent according to one embodiment may further include an aromatic hydrocarbon-based solvent as well as the carbonate-based solvent. The carbonate-based solvent and aromatic hydrocarbon-based solvent may be mixed together in a volume ratio of about 1:1 to about 30:1.

The aromatic hydrocarbon-based organic solvent may be an aromatic hydrocarbon-based compound represented by the following Chemical Formula 1.

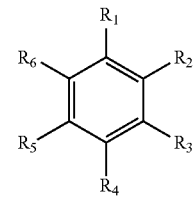

Chemical Formula 1

In the above Chemical Formula 1, $R_1$ to $R_6$ are the same or different and are each selected from hydrogen, a halogen, C1 to C10 alkyl group, a haloalkyl group, or a combination thereof.

Examples of the aromatic hydrocarbon-based organic solvent include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate or an ethylene carbonate-based compound represented by the following Chemical Formula 2 to improve the cycle life.

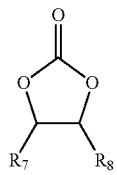

Chemical Formula 2

In the above Chemical Formula 2, $R_7$ and $R_8$ are the same or different and may be each independently hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group, and $R_7$ and $R_8$ are not simultaneously hydrogen.

Examples of the ethylene carbonate-based compound include difluoro ethylenecarbonate, chloroethylene carbonate, dichloroethylene carbonate, bromoethylene carbonate, dibromoethylene carbonate, nitroethylene carbonate, cyanoethylene carbonate, and fluoroethylene carbonate. The amount of the ethylene carbonate-based compound for improving cycle life may be flexibly used within a suitable range.

The lithium salt is dissolved in an organic solvent and supplies a battery with lithium ions. The lithium salt enables the basic operation of the rechargeable lithium battery, and improves transportation of the lithium ions between the positive and negative electrodes. Examples of suitable lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI or $LiB(C_2O_4)_2$ (lithium bis(oxalato)borate; LiBOB). The lithium salt may be used in a concentration from about 0.1 M to about 2.0 M. In one embodiment, when the lithium salt is included at the above concentration range, the electrolyte has excellent performance and lithium ion mobility due to desired electrolyte conductivity and viscosity.

The rechargeable lithium battery may further include a separator between the negative electrode and the positive electrode, depending on the kind of the battery. Examples of a suitable separator material include polyethylene, polypropylene, polyvinylidene fluoride, and multi-layers thereof, such as a polyethylene/polypropylene double-layered separator, a polyethylene/polypropylene/polyethylene triple-layered separator, or a polypropylene/polyethylene/polypropylene triple-layered separator.

Hereinafter, examples and comparative examples are described. These examples, however, are not in any sense to be interpreted as limiting the scope of the invention.

EXAMPLE 1

Positive active material slurry was prepared by mixing 85 wt % of $LiCoO_2$ having an average particle diameter of 6.6 µm, 5 wt % of activated carbon having an average particle diameter (D50) of 6.8 µm (pitch-based, Kuraray Co., Ltd.), 4 wt % of an acetylene black conductive material (Electrochemical Corporation), and 6 wt % of a polyvinylidene fluoride binder in an N-methyl pyrrolidone solvent.

The positive active material slurry was coated on a 15 µm-thick Al foil, dried at 100° C., and pressed, manufacturing a positive electrode having an active material layer (a positive active material layer) with a mass density of 2.6 g/cc.

Negative active material slurry was prepared by mixing 85 wt % of amorphous soft carbon (Hitachi Ltd.) having an average particle diameter of 10 µm and an interlayer spacing (d002) of a (002) plane of 0.42 nm as a negative active material, 5 wt % of acetylene black (Electrochemical Corporation), and 10 wt % of a polyvinylidene fluoride binder in an N-methyl pyrrolidone solvent.

The negative active material slurry was coated on a 10 µm-thick Cu foil, dried at 100° C., and pressed, thereby manufacturing a negative electrode having an active material layer (a negative active material layer) with a mass density of 1.2 g/cc.

Subsequently, a separator was interposed between the positive and negative electrodes, and the positive and negative electrodes with the separator were wound into a cylindrical jelly-roll. The separator was a 25 µm-thick V25CGD porous film.

The jelly-roll was housed in an 18650-sized battery case, and an electrolyte solution was injected, manufacturing a rechargeable lithium battery cell. The electrolyte solution was prepared by mixing ethylene carbonate and ethylmethyl carbonate in a volume ratio of 3:7 and dissolving 1.0 M $LiPF_6$ therein.

EXAMPLE 2

A rechargeable lithium battery cell was manufactured according to the same method as Example 1 except for preparing the positive active material slurry by mixing 85 wt % of $LiCoO_2$ having an average particle diameter of 6.4 µm, 5 wt % of activated carbon having an average particle diameter (D50) of 6.65 µm (pitch-based Kuraray Co. Ltd.), 4 wt % of an acetylene black (Electrochemical Corporation) conductive material, and 6 wt % of a polyvinylidene fluoride binder in an N-methyl pyrrolidone solvent.

EXAMPLE 3

A rechargeable lithium battery cell was manufactured according to the same method as Example 1 except for preparing the positive active material slurry by mixing 85 wt % of $LiCoO_2$ having an average particle diameter of 6.6 µm, 5 wt % of activated carbon having an average particle diameter (D50) of 8.08 µm (pitch-based, Kuraray Co., Ltd.), 4 wt % of an acetylene black (Electrochemical Corporation) conductive material, and 6 wt % of a polyvinylidene fluoride binder in an N-methyl pyrrolidone solvent.

EXAMPLE 4

A rechargeable lithium battery cell was manufactured according to the same method as Example 1 except for preparing the positive active material slurry by mixing 85 wt % of $LiCoO_2$ having an average particle diameter of 5 µm, 5 wt % of activated carbon having an average particle diameter (D50) of 6.65 µm (pitch-based, Kuraray Co., Ltd.), 4 wt % of an acetylene black (Electrochemical Corporation) conductive material, and 6 wt % of a polyvinylidene fluoride binder in an N-methyl pyrrolidone solvent.

EXAMPLE 5

A rechargeable lithium battery cell was manufactured according to the same method as Example 1 except for preparing the positive active material slurry by mixing 85 wt % of $LiCoO_2$ having an average particle diameter of 5 µm, 5 wt % of activated carbon having an average particle diameter (D50) of 7 µm (pitch-based, Kuraray Co., Ltd.), 4 wt % of an acetylene black (Electrochemical Corporation) conductive material, and 6 wt % of a polyvinylidene fluoride binder in an N-methyl pyrrolidone solvent.

EXAMPLE 6

A rechargeable lithium battery cell was manufactured according to the same method as Example 1 except for preparing the positive active material slurry by mixing 85 wt % of $LiCoO_2$ having an average particle diameter of 5 µm, 5 wt % of activated carbon having an average particle diameter (D50) of 8 µm (pitch-based, Kuraray Co., Ltd.), 4 wt % of an acetylene black (Electrochemical Corporation)

conductive material, and 6 wt % of a polyvinylidene fluoride binder in an N-methyl pyrrolidone solvent.

EXAMPLE 7

A rechargeable lithium battery cell was manufactured according to the same method as Example 1 except for preparing the positive active material slurry by mixing 85 wt % of Li(Ni$_{1/3}$Co$_{1/3}$Mn$_{1/3}$)O$_2$ having an average particle diameter of 3.5 μm, 5 wt % of activated carbon having an average particle diameter (D50) of 8 μm (pitch-based, Kuraray Co., Ltd.), 4 wt % of an acetylene black (Electrochemical Corporation) conductive material, and 6 wt % of a polyvinylidene fluoride binder in an N-methyl pyrrolidone solvent and manufacturing an electrode to have an active material layer with a mass density of 2.4 g/cc.

EXAMPLE 8

A rechargeable lithium battery cell was manufactured according to the same method as Example 1 except for preparing the positive active material slurry by mixing 85 wt % of Li(Ni$_{1/3}$Co$_{1/3}$Mn$_{1/3}$)O$_2$ having an average particle diameter of 3.5 μm, 5 wt % of activated carbon having an average particle diameter (D50) of 5 μm (pitch-based, Kuraray Co., Ltd.), 4 wt % of an acetylene black (Electrochemical Corporation) conductive material, and 6 wt % of a polyvinylidene fluoride binder in an N-methyl pyrrolidone solvent and manufacturing an electrode to have an active material layer with a mass density of 2.4 g/cc.

EXAMPLE 9

A rechargeable lithium battery cell was manufactured according to the same method as Example 1 except for preparing the positive active material slurry by mixing 85 wt % of Li(Ni$_{1/3}$Co$_{1/3}$Mn$_{1/3}$)O$_2$ having an average particle diameter of 3.5 μm, 5 wt % of activated carbon having an average particle diameter (D50) of 14 μm (pitch-based, Kuraray Co., Ltd.), 4 wt % of an acetylene black (Electrochemical Corporation) conductive material, and 6 wt % of a polyvinylidene fluoride binder in an N-methyl pyrrolidone solvent and manufacturing an electrode to have an active material layer with a mass density of 2.4 g/cc.

EXAMPLE 10

A rechargeable lithium battery cell was manufactured according to the same method as Example 1 except for preparing the positive active material slurry by mixing 85 wt % of Li(Ni$_{1/3}$Co$_{1/3}$Mn$_{1/3}$)O$_2$ having an average particle diameter of 3.5 μm, 5 wt % of activated carbon having an average particle diameter (D50) of 24 μm (pitch-based, Kuraray Co., Ltd.), 4 wt % of an acetylene black (Electrochemical Corporation) conductive material, and 6 wt % of a polyvinylidene fluoride binder in an N-methyl pyrrolidone solvent and manufacturing an electrode to have an active material layer with a mass density of 2.4 g/cc.

EXAMPLE 11

A rechargeable lithium battery cell was manufactured according to the same method as Example 1 except for preparing the positive active material slurry by mixing 85 wt % of LiFePO$_4$ having an average particle diameter of 0.35 μm, 5 wt % of activated carbon having an average particle diameter (D50) of 8 μm (pitch-based, Kuraray Co., Ltd.), 4 wt % of an acetylene black (Electrochemical Corporation) conductive material, and 6 wt % of a polyvinylidene fluoride binder in an N-methyl pyrrolidone solvent and manufacturing an electrode to have an active material layer with a mass density of 1.9 g/cc.

EXAMPLE 12

A rechargeable lithium battery cell was manufactured according to the same method as Example 1 except for preparing the positive active material slurry by mixing 85 wt % of LiFePO$_4$ having an average particle diameter of 0.35 μm, 5 wt % of activated carbon having an average particle diameter (D50) of 5 μm (pitch-based, Kuraray Co., Ltd.), 4 wt % of an acetylene black (Electrochemical Corporation) conductive material, and 6 wt % of a polyvinylidene fluoride binder in an N-methyl pyrrolidone solvent and manufacturing an electrode to have an active material layer with a mass density of 1.9 g/cc.

COMPARATIVE EXAMPLE 1

A rechargeable lithium battery cell was manufactured according to the same method as Example 1 except for preparing the positive active material slurry by mixing 85 wt % of LiCoO$_2$ having an average particle diameter of 5 μm, 5 wt % of activated carbon having an average particle diameter (D50) of 5 μm (pitch-based, Kuraray Co., Ltd.), 4 wt % of an acetylene black (Electrochemical Corporation) conductive material, and 6 wt % of a polyvinylidene fluoride binder in a N-methyl pyrrolidone solvent.

COMPARATIVE EXAMPLE 2

A rechargeable lithium battery cell was manufactured according to the same method as Example 1 except for preparing the positive active material slurry by mixing 85 wt % of LiCoO$_2$ having an average particle diameter of 6.6 μm, 5 wt % of activated carbon having an average particle diameter (D50) of 3.85 μm (pitch-based, Kuraray Co., Ltd.), 4 wt % of an acetylene black (Electrochemical Corporation) conductive material, and 6 wt % of a polyvinylidene fluoride binder in a N-methyl pyrrolidone solvent.

COMPARATIVE EXAMPLE 3

A rechargeable lithium battery cell was manufactured according to the same method as Example 1 except for preparing the positive active material slurry by mixing 85 wt % of LiCoO$_2$ having an average particle diameter of 5 μm, 5 wt % of activated carbon having an average particle diameter (D50) of 4 μm (pitch-based, Kuraray Co., Ltd.), 4 wt % of an acetylene black (Electrochemical Corporation) conductive material, and 6 wt % of a polyvinylidene fluoride binder in a N-methyl pyrrolidone solvent.

COMPARATIVE EXAMPLE 4

A rechargeable lithium battery cell was manufactured according to the same method as Example 1 except for preparing the positive active material slurry by mixing 90 wt % of LiCoO$_2$ having an average particle diameter of 5 μm, 0 wt % of activated carbon having an average particle diameter (D50) of 6.8 μm (pitch-based, Kuraray Co., Ltd.), 4 wt % of an acetylene black (Electrochemical Corporation) conductive material, and 6 wt % of a polyvinylidene fluoride binder in a N-methyl pyrrolidone solvent.

COMPARATIVE EXAMPLE 5

A rechargeable lithium battery cell was manufactured according to the same method as Example 1 except for preparing the positive active material slurry by mixing 90 wt % of LiNi$_{1/3}$Co$_{1/3}$Mn$_{1/3}$O$_2$ having an average particle diameter of 3.5 μm, 0 wt % of activated carbon having an average particle diameter (D50) of 8 μm (pitch-based, Kuraray Co., Ltd.), 4 wt % of an acetylene black (Electrochemical Corporation) conductive material, and 6 wt % of a polyvinylidene fluoride binder in a N-methyl pyrrolidone solvent, manufacturing a positive electrode to have an active material layer with a mass density of 2.4 g/cc, and using hard carbon as a negative active material.

COMPARATIVE EXAMPLE 6

A rechargeable lithium battery cell was manufactured according to the same method as Example 1 except for preparing the positive active material slurry by mixing 90 wt % of LiFePO$_4$ having an average particle diameter of 0.35 μm, 0 wt % of activated carbon having an average particle diameter (D50) of 8 μm (pitch-based, Kuraray Co., Ltd.), 4 wt % of an acetylene black (Electrochemical Corporation) conductive material, and 6 wt % of a polyvinylidene fluoride binder in a N-methyl pyrrolidone solvent, manufacturing an electrode to have an active material layer with a mass density of 2.2 g/cc, and using hard carbon as a negative active material.

COMPARATIVE EXAMPLE 7

A rechargeable lithium battery cell was manufactured according to the same method as Example 1 except for preparing the positive active material slurry by mixing 90 wt % of LiFePO$_4$ having an average particle diameter of 0.35 μm, 5 wt % of activated carbon having an average particle diameter (D50) of 12 μm (pitch-based, Kuraray Co., Ltd.), 4 wt % of an acetylene black (Electrochemical Corporation) conductive material, and 6 wt % of a polyvinylidene fluoride binder in a N-methyl pyrrolidone solvent, manufacturing a positive electrode to have an active material layer with a mass density of 1.9 g/cc, and using hard carbon as a negative active material.

COMPARATIVE EXAMPLE 8

A rechargeable lithium battery cell was manufactured according to the same method as Example 1 except for preparing the positive active material slurry by mixing 85 wt % of LiFePO$_4$ having an average particle diameter of 0.35 μm, 5 wt % of activated carbon having an average particle diameter (D50) of 14 μm (pitch-based, Kuraray Co., Ltd.), 4 wt % of an acetylene black (Electrochemical Corporation) conductive material, and 6 wt % of a polyvinylidene fluoride binder in a N-methyl pyrrolidone solvent, manufacturing a positive electrode to have an active material layer with a mass density of 2.2 g/cc, and using hard carbon as a negative active material.

EVALUATION EXAMPLE 1

Measurement of Initial Capacity

The rechargeable lithium battery cells according to Examples 1 to 12 and Comparative Examples 1 to 8 were charged under a constant current of 0.2 C and cut off at a battery voltage of 4.2 V. Subsequently, the rechargeable lithium battery cells were discharged under a constant current of 0.2 C and cut-off at a battery voltage of 2.0 V. After the charge and discharge process, the rechargeable lithium battery cells were measured regarding battery capacity. The measured capacity is used as initial capacity, and the results are provided as 0.2 C capacity in the following Table 1.

EVALUATION EXAMPLE 2

High Rate Discharge Characteristic

Subsequently, the rechargeable lithium battery cells were charged under a constant current at 1 C after measuring the initial capacity, cut off at a battery voltage of 4.2 V, and discharged to 2.0 V at 50 C of a current. Then, capacity of the rechargeable lithium battery cells were measured, and a ratio of the 50 C discharge capacity relative to 1 C charge capacity (50 C/1 C, %) was calculated. The results are provided as a 50 C rate in the following Table 1 to show high-rate discharge characteristics.

EVALUATION EXAMPLE 3

Cycle-life Characteristics

In addition, the rechargeable lithium battery cells were repetitively charged at 30 C up to 4.2 V and discharged at 30 C to 2.0 V for 1000 times after measuring the initial capacity, and then, residual capacity % of the 1000th discharge capacity relative to the initial capacity was calculated. The results are provided in the following Table 1.

EVALUATION EXAMPLE 4

Measurement of Electrical Conductivity

Furthermore, electrical conductivity of the positive electrodes according to Examples 1 to 12 and Comparative Examples 1 to 8 was measured by using an electrical conductivity measuring device (a resistance measuring device, CIS), and the results are provided in the following Table 1.

TABLE 1

| | Positive electrode | Negative electrode | Activated carbon particle diameter/active material particle diameter (%) | Positive electrode conductivity (S/m) | 0.2 C capacity (mAh/g) | 50 C rate (50 C/1 C) | Residual capacity %, 30 C/30 C cycle (1000$^{th}$/1$^{st}$ cycle, %) |
|---|---|---|---|---|---|---|---|
| Example 1 | LiCoO$_2$: 6.6 μm, 85 wt % activated carbon: 6.8 μm, 5 wt % | amorphous carbon | 103 | 0.2 | 128 | 82% | 89% |
| Example 2 | LiCoO$_2$: 6.4 μm, 85 wt % activated carbon: 6.65 μm, 5 wt % | amorphous carbon | 104 | 0.21 | 125 | 84% | 88% |

TABLE 1-continued

|  | Positive electrode | Negative electrode | Activated carbon particle diameter/ active material particle diameter (%) | Positive electrode conductivity (S/m) | 0.2 C capacity (mAh/g) | 50 C rate (50 C/ 1 C) | Residual capacity %, 30 C/30 C cycle (1000$^{th}$/1$^{st}$ cycle, %) |
|---|---|---|---|---|---|---|---|
| Example 3 | LiCoO$_2$: 6.6 μm, 85 wt % activated carbon: 8.08 μm, 5 wt % | amorphous carbon | 122 | 0.14 | 132 | 81% | 90% |
| Example 4 | LiCoO$_2$: 5 μm, 85 wt % activated carbon: 6.65 μm, 5 wt % | amorphous carbon | 133 | 0.11 | 129 | 83% | 96% |
| Example 5 | LiCoO$_2$: 5 μm, 85 wt % activated carbon: 7 μm, 5 wt % | amorphous carbon | 140 | 0.18 | 131 | 83% | 91% |
| Example 6 | LiCoO$_2$: 5 μm, 85 wt % activated carbon: 8 μm, 5 wt % | amorphous carbon | 160 | 0.17 | 125 | 83% | 88% |
| Example 7 | LiNi$_{1/3}$Co$_{1/3}$Mn$_{1/3}$O$_2$: 3.5 μm, 85 wt % activated carbon: 8 μm, 5 wt % | amorphous carbon | 228 | 0.047 | 136 | 87% | 85% |
| Example 8 | LiNi$_{1/3}$Co$_{1/3}$Mn$_{1/3}$O$_2$: 3.5 μm, 85 wt % activated carbon: 5 μm, 5 wt % | amorphous carbon | 142 | 0.043 | 132 | 86% | 87% |
| Example 9 | LiNi$_{1/3}$Co$_{1/3}$Mn$_{1/3}$O$_2$: 3.5 μm, 85 wt % activated carbon: 14 μm, 5 wt % | amorphous carbon | 400 | 0.040 | 129 | 81% | 84% |
| Example 10 | LiNi$_{1/3}$Co$_{1/3}$Mn$_{1/3}$O$_2$: 3.5 μm, 85 wt % activated carbon: 24 μm, 5 wt % | amorphous carbon | 685 | 0.038 | 128 | 71 | 80 |
| Example 11 | LiFePO$_4$: 0.35 μm, 85 wt % activated carbon: 8 μm, 5 wt % | amorphous carbon | 2286 | 0.053 | 116 | 74% | 83% |
| Example 12 | LiFePO$_4$: 0.35 μm, 85 wt % activated carbon: 5 μm, 5 wt % | amorphous carbon | 1429 | 0.049 | 115 | 73% | 81% |
| Comparative Example 1 | LiCoO$_2$: 5 μm, 85 wt % activated carbon: 4 μm, 5 wt % | amorphous carbon | 40 | 0.092 | 129 | 65% | 68% |
| Comparative Example 2 | LiCoO$_2$: 6.6 μm, 85 wt % activated carbon: 3.85 μm, 5 wt % | amorphous carbon | 58 | 0.11 | 127 | 76% | 66% |
| Comparative Example 3 | LiCoO$_2$: 5 μm, 85 wt % activated carbon: 4 μm, 5 wt % | amorphous carbon | 80 | 0.117 | 129 | 80% | 71% |
| Comparative Example 4 | LiCoO$_2$: 5 μm, 90 wt % activated carbon: 6.8 μm, 0 wt % | amorphous carbon | 0 | 0.01 | 133 | 64% | 61% |
| Comparative Example 5 | LiNi$_{1/3}$Co$_{1/3}$Mn$_{1/3}$O$_2$: 3.5 μm, 90 wt % activated carbon: 8 μm, 0 wt % | amorphous carbon | 0 | 0.023 | 138 | 65% | 67% |
| Comparative Example 6 | LiFePO$_4$: 0.35 μm, 90 wt % activated carbon: 8 μm, 0 wt % | amorphous carbon | 0 | 0.033 | 119 | 61% | 64% |
| Comparative Example 7 | LiFePO$_4$: 0.35 μm, 85 wt % activated carbon: 12 μm, 5 wt % | amorphous carbon | 3400 | 0.044 | 111 | 67% | 69% |
| Comparative Example 8 | LiFePO$_4$: 0.35 μm, 85 wt % activated carbon: 14 μm, 5 wt % | amorphous carbon | 4000 | 0.048 | 111 | 67% | 70% |

As shown in Table 1, the battery cells according to Examples 1 to 12 showed excellent high-rate capability (50 C rate) and residual capacity % compared with the battery cells according to Comparative Examples 1 to 8.

Accordingly, embodiments of the present invention provide a battery having high power and cycle-life characteristics.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A rechargeable lithium battery, comprising:
   a negative electrode comprising a negative active material; and
   a positive electrode consisting of a current collector and a mixture, the mixture consisting of a positive active material, activated carbon, a conductive material and a binder all mixed together,
   wherein the negative active material comprises a carbon-based material having an interlayer spacing of a (002) plane from about 0.34 nm to about 0.50 nm measured by X-ray diffraction using CuKα,
   the positive active material consists of a lithium iron phosphate-based compound, and
   an average particle diameter of the activated carbon is greater than or equal to about 1000% and less than or equal to about 3000% of an average particle diameter of the positive active material.

2. The rechargeable lithium battery of claim 1, wherein the average particle diameter of the activated carbon is greater than or equal to about 1000% and less than or equal to about 2500% of the average particle diameter of the positive active material.

3. The rechargeable lithium battery of claim 1, wherein the positive active material has an olivine structure.

4. The rechargeable lithium battery of claim 1, wherein the positive active material has an average particle diameter of about 0.1 μm to about 20 μm.

5. The rechargeable lithium battery of claim 1, wherein the activated carbon has an average particle diameter of about 1 μm to about 30 μm.

6. The rechargeable lithium battery of claim 1, wherein the activated carbon is included in an amount of about 1 wt % to about 40 wt % based on a total amount of the positive active material and the activated carbon.

7. The rechargeable lithium battery of claim 1, wherein the carbon-based material is amorphous carbon.

8. The rechargeable lithium battery of claim 1, wherein the carbon-based material is soft carbon, hard carbon, a mesophase pitch carbonized product, fired coke, or a combination thereof.

9. The rechargeable lithium battery of claim 1, wherein the carbon-based material has an average particle diameter of about 1 μm to about 50 μm.

10. The rechargeable lithium battery of claim 1, wherein the positive active material has a structure where a plurality of primary particles are aggregated to form a secondary particle.

* * * * *